Nov. 3, 1942.   J. H. BLANKENBUEHLER   2,300,867
WELDING GENERATOR
Filed July 24, 1941

WITNESSES:
Leon M. Garman
F. V. Giolma

INVENTOR
John H. Blankenbuehler.
BY
Crawford
ATTORNEY

Patented Nov. 3, 1942

2,300,867

UNITED STATES PATENT OFFICE 2,300,867

WELDING GENERATOR

John H. Blankenbuehler, Edgewood, Pa., assignor to Westinghouse Electric & Manufacturing Company, East Pittsburgh, Pa., a corporation of Pennsylvania Application July 24, 1941, Serial No. 403,827

7 Claims. (Cl. 171—227)

My invention relates generally to generators, and it has reference in particular to arc welding generators of the cross-field type.

Generally stated, it is an object of my invention to provide for improving the load characteristics of an arc welding generator.

More specifically, it is an object of my invention to improve the transient characteristics of generators of the cross-field type so as to minimize current fluctuations between short circuit and welding conditions.

Another object of my invention is to provide for introducing a relatively large amount of self-inductance in the otherwise relatively non-inductive arc circuit of a generator of the cross-field type so as to minimize the dip in welding current between striking and establishing an arc.

Yet another object of my invention is to provide for making one field pole of a generator saturate at relatively low values of load current while the opposed field pole remains unsaturated under a wide range of load conditions.

Still another object of my invention is to provide for increasing the self-inductance of the load circuit of a generator so as to improve the operating characteristics of the generator when welding with relatively low current values.

It is also an object of my invention to provide a welding generator having a relatively large amount of leakage flux which varies substantially directly with the welding current with means for linking a relatively large amount of said leakage flux with the turns of the series field winding to increase its self-inductance.

Other objects will in part be obvious, and will in part be described hereinafter.

In accordance with my invention, one field pole of a generator of the cross-field type may be provided with a body portion having a relatively large cross section so as to prevent saturation by the series field winding positioned thereon under any welding condition. Magnetic shunt members or leakage poles may be provided adjacent this winding to provide a relatively low reluctance path for a relatively large amount of leakage flux to link the turns of a series field winding on the body portion. The opposing field pole may be provided with a body portion having a reduced cross-section so that it is saturated by the series field winding positioned thereon at a current value less than the minimum welding current. By thus modifying the well-known cross field type of generator, the load characteristics thereof may be so improved that the transient droop normally occurring in the current between short circuit conditions when striking the arc, and steady state welding conditions, is greatly reduced, thus making it easier to strike and maintain the arc and secure sound welds at relatively low current values.

For a more complete understanding of the nature and scope of my invention reference may be had to the following detailed description, which may be read in connection with the accompanying drawing in which.

Figure 1:
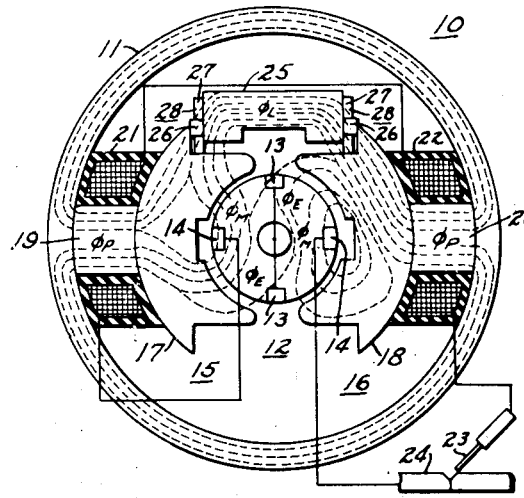
Figure 1 is a diagrammatic cross-sectional view of a cross-field generator of the usual type.

Referring to Fig. 1, the reference numeral 10 may denote generally an arc welding generator of the cross-field type of the usual construction, comprising a frame 11 having an armature 12 rotatably mounted therein and provided with auxiliary close-circuited brushes 13 and main load circuit brushes 14 positioned along axes substantially at right angles to each other.

Field poles 15 and 16 are mounted in the frame 11 on opposite sides of the armature in any suitable manner. As shown, the field poles comprise relatively large arcuate shoe portions 17 and 18 positioned adjacent the armature to provide relatively low reluctance paths for a cross-field flux produced by the current circulating in the armature between the auxiliary brushes, and body portions 19 and 20, respectively, having relatively small cross sections, so as to be saturated substantially throughout the entire range of welding currents by the series field windings 21 and 22 positioned thereon and connected in series circuit relation with the main brushes 14 and the arc circuit which includes an electrode 23 and work 24 upon which a welding operation is to be performed.

Suitable means may be provided for varying the output of the generator 10 such as, for example, the magnetic shunt member 25, which is positioned between the arcuate shoe members 17 and 18 to vary the amount of magnetic flux by-passed about the armature. The shunt member 25 may be adjustably mounted, being, for example, supported by means of projections 26 on the sloping surfaces 27 of guide members 28 which may be secured to the adjacent tips of the shoe members 17 and 18, respectively, in the same manner as described in my copending application Serial No. 280,687, filed June 23, 1939, and assigned to the assignee of this application.

Figure 2:
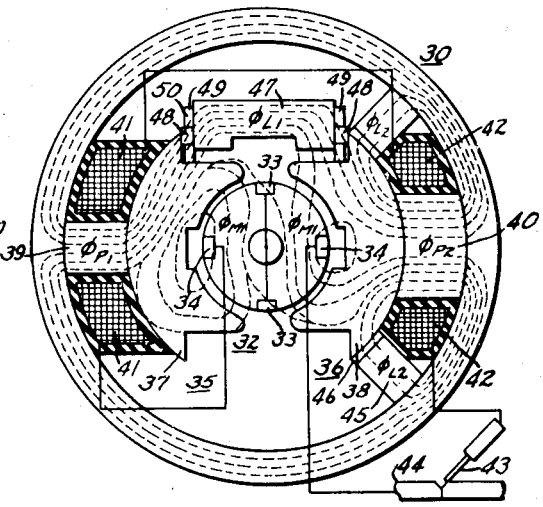
Fig. 2 is a diagrammatic cross sectional view of a generator of the cross-field type embodying the principal features of the invention.

Referring to Fig. 2, the reference numeral 30 may denote generally my improved type of cross-field generator, which may be provided with a frame 31 having either a greater cross-section generally than the frame of the usual type of cross-field generator shown in Fig. 1, or an additional portion adjacent one side to carry additional magnetic flux. The armature 32, which may be rotatably mounted in the frame in any suitable manner, may be of the usual cross-field type, having auxiliary close-circuited brushes 33, and main load circuit brushes 34 located along axes substantially at right angles to each other.

Field poles 35 and 36 may be positioned within the frame 31 on opposite sides of the armature 32 in any suitable manner. As illustrated, the field poles may comprise arcuate shoe members 37 and 38, which may be relatively large as heretofore, in order to provide a relatively low reluctance path for the cross-field flux generated by the current in the auxiliary brush circuit of the armature, and body portions 39 and 40 having field windings 41 and 42 positioned thereon and connected in series circuit relation with the main load circuit brushes 34 and the welding circuit, which may include the electrode 43 and work 44 upon which a welding operation is to be performed.

The body member 40 of the field pole 36, instead of having a relatively small cross-section as does the body member 20 of the cross-field generator of the usual type, is provided with a relatively large cross-section, so as to remain unsaturated for substantially any value of load current in the series field winding 42.

In order to increase the self-inductance of the series field winding 42, means may be provided for linking a relatively large amount of the magnetic flux produced in the body member 40 with the turns of the winding. For example, magnetic shunt members 45 may be positioned adjacent the winding 42, being, for example, positioned between the tips of the shoe members and the frame, and secured to the frame 31 in any suitable manner, so as to provide a relatively low reluctance flux leakage path which substantially encircles the turns of the winding 42. If desired, air gaps may be provided in the leakage path, or spacers of non-magnetic material 46 may be inserted therein in order not to shunt too much of the flux produced by the winding 42.

The body member 39 of the field pole 35 may be so constructed as to be saturated under substantially all welding conditions. In order to compensate for changes in the characteristic volt-ampere curve of the generator caused by having the body member of only one field pole saturated instead of both, as heretofore, the cross-section of the body member 39 may be made even smaller than heretofore, and the number of turns may be increased over the customary number.

Control of the generator output may be effected in the usual manner, such as by means of a magnetic shunt member 47, which may be slidably supported by means of projections 48 on the sloping guide surfaces 49 of guide member 50 secured to the shoe members in a manner such as described in connection with the generator 10.

Referring again to Fig. 1 which shows a cross-field generator of the usual construction, it will be apparent from the dotted lines representing the various flux paths that, since the body members 19 and 20 of the field pole members are designed to be saturated throughout the normal range of welding conditions, the flux $\phi_P$ in the body members produced by the series field windings 21 and 22 remains substantially constant under operating conditions. The main flux $\phi_M$ is produced by the circulating current in the auxiliary brush circuit of the armature, while the residual or excitation flux which initially causes a current to flow between the closed circuit auxiliary brushes is denoted by $\phi_E$. Since the total flux in the body members of the field pole members or $\phi_P$ remain substantially constant, the main flux $\phi_M$ will be varied by adjusting the magnetic shunt member 25 to increase or decrease the leakage flux $\phi_L$.

Figure 3:
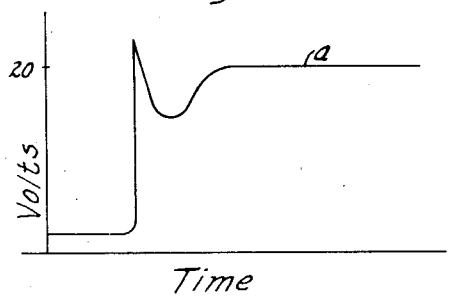
Figs. 3 and 4 are reproductions of oscillographic curves of the voltage and current of the generator of Fig. 1 under load conditions.
Figure 4:
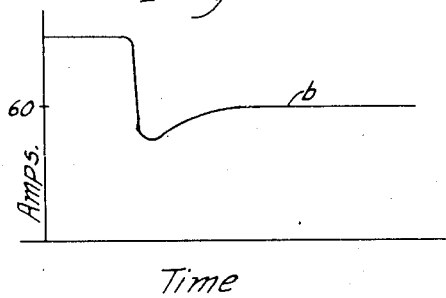

Since little or no leakage flux links the series field winding of a generator of the cross-field type, of the usual construction, the series field winding has practically no inductance, and no such leakage flux is therefore shown. Because the body members are saturated, any leakage flux which might exist is substantially constant, and therefore the self-inductance of the series field windings is exceedingly low. Because of the exceedingly low self-inductance of the series field windings or arc circuit in a generator of the cross-field type of the usual construction, quite a dip occurs both in the voltage and current of the usual type of cross-field generator during the transition from short circuit to the steady state welding condition, as shown in the curves a and b of Figs. 3 and 4, respectively. For example, the current in the instance illustrated, where the shunt 25 was adjusted for welding at 60 amperes and 20 volts, dipped to a value amounting to 73% of the final steady state welding current, which is undesirable in welding.

In the improved form of generator shown in Fig. 2, the flux $\phi_{P1}$ remains substantially constant, as the body member 39 is saturated. Movement of the shunt 47 varies the leakage flux $\phi_{L1}$ as heretofore and controls $\phi_{M1}$, and hence the output of the generator.

Figure 5:
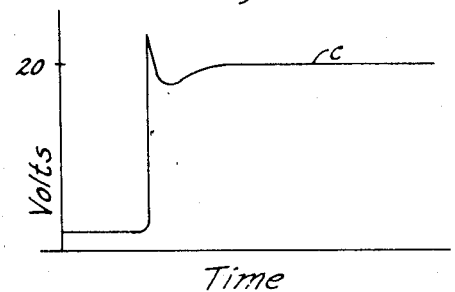
Figs. 5 and 6 are reproductions of oscillographic curves of the voltage and current of the improved generator of Fig. 2 under load conditions.
Figure 6:
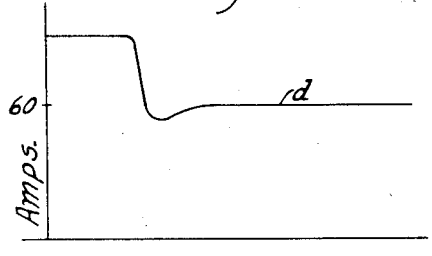

Since the body member 40 of the field pole 36 remains unsaturated under substantially all conditions of welding current the flux $\phi_{P2}$ varies substantially directly with the current in the series field winding 42. The leakage flux $\phi_{L2}$ through the magnetic shunt members or leakage poles 45 also varies with the current through the series field winding 42 and the arc circuit. Since this leakage flux links the turns of the series field winding 42 it greatly increases the self-inductance thereof. Accordingly, when the welding current is changing from a relatively high value, such as under short circuit conditions when striking the arc, to the normal steady state value for which the magnetic shunt member 47 may be set, the leakage flux $\phi_{L2}$ acts to retard the change, and thus reduces the amount of "undershoot" or dip. Thus, as shown in Figs. 5 and 6, the dip in both the arc voltage and arc current indicated by the curves c and d during the transition between short circuit and steady state welding conditions is greatly reduced. In the instance shown, for which the shunt member 47 was adjusted for welding at 60 amperes and 20 volts, the lowest value to which the current dropped during the transition period was substantially 90% of the steady state value of the welding current for which the adjustable shunt member was set, thus facilitating greatly striking of the arc, particularly, when welding at relatively low current values.

From the above description and the accompanying drawing, it will be apparent that I have provided a simple and effective manner for improving the load characteristics of generators of the cross-field type. By increasing the self-inductance of a series field winding in the manner described, and increasing the number of turns in the other series field winding and reducing the cross section of the body member of the other field pole substantially the same volt-ampere or load characteristic curve may be secured as with the usual type of cross-field generator, while the transient characteristics of the improved type of generator are greatly improved. With the modified form of cross-field generator a stable welding arc may be maintained at much lower values of welding current than heretofore and striking of the arc is greatly facilitated.

Since certain changes may be made in the above described construction, and different embodiments of the invention may be made without departing from the spirit thereof, it is intended that all the subject matter contained in the above description and shown in the accompanying drawing shall be considered as illustrative and not in a limiting sense.

I claim as my invention:

1. A generator comprising, a frame structure, an armature, a field pole positioned in the frame structure having an arcuate shoe portion adjacent the armature and a body portion with a series field winding thereon, said body portion having a relatively large cross section so as to remain unsaturated under a wide range of load conditions, leakage poles positioned adjacent the field pole member to provide a path for leakage flux linking the series field winding, and an additional field pole positioned in the frame structure in opposed relation having a body portion with a series field winding thereon, said body portion having a relatively small cross section so as to be saturated under substantially all load conditions.

2. A generator of the cross-field type comprising, a frame, an armature having close-circuited auxiliary brushes and load circuit brushes positioned along axes substantially at right angles to each other, a field pole secured in the frame having an arcuate shoe portion adjacent the armature and a body portion with sufficient cross section to prevent saturation under substantially all load conditions, a field winding positioned about the body portion connected in series with the load circuit, a leakage pole of magnetic material positioned adjacent the said field pole to provide a leakage path between one edge of the shoe and the frame linking the winding, a spacer of non-magnetic material positioned in the leakage path, an additional field pole secured in the frame in opposed relation having an arcuate shoe portion adjacent the armature and a body portion of relatively small section so as to saturate at relatively low values of load current, and a winding positioned about the body portion thereof connected in series with the load circuit.

3. The combination in a generator of the cross-field type having an armature rotatably positioned in a frame with main circuit brushes and close-circuited auxiliary brushes positioned along axes substantially at right angles to each other and arcuate shoe members adjacent the armature on opposite sides along the axis of the main brushes, of a pole body having a winding thereon connected in series circuit relation with the main brushes positioned between one shoe member and the frame, said pole body having a relatively large cross section to prevent saturation, a magnetic leakage member positioned between the frame and the arcuate shoe member to provide a leakage path for a magnetic flux varying substantially with the current in the main brush circuit, and an additional body member having a field winding thereon positioned between the other arcuate shoe member and the frame.

4. The combination in a generator of the cross-field type having a frame with an armature rotatably mounted therein having main load circuit brushes and close-circuited auxiliary brushes located on axes substantially at right angles to each other, of a field pole having an arcuate shoe portion adjacent the armature substantially on the axis of the main load circuit brushes and a relatively large body member positioned between the shoe portion and the frame with a winding thereon connected in series circuit relation with the main brushes, said body member being of sufficient cross section to prevent saturation under all load conditions, and a magnetic shunt member positioned between the shoe portion and the frame outside the winding to link a relatively large amount of flux therewith varying substantially directly with the current in the load circuit, and an additional field pole having an arcuate shoe portion positioned in opposed relation to said first-mentioned field pole.

5. The combination in a welding generator of the cross-field type having a frame with an armature rotatably mounted therein provided with main load circuit brushes and close circuited auxiliary brushes located along an axis substantially at right angles thereto, arcuate shoe members positioned adjacent the armature on opposite sides on the axis of the main brushes, and adjustable magnetic shunt means for varying the leakage flux between the shoe members, of a pole body member positioned between one of the shoe members and the frame having a series field winding thereon and a cross sectional area sufficient to prevent saturation for any value of welding current, a fixed magnetic leakage member positioned between the shoe member and the frame outside the winding, and an additional pole body member having a relatively small cross-sectional area with a series field winding thereon to effect saturation below the minimum value of welding current positioned between the other shoe member and the frame.

6. A welding generator of the cross-field type comprising, a frame, an armature rotatably positioned in the frame having main and close circuited auxiliary brushes located along axes substantially at right angles, a field pole member positioned between the armature and the frame having a winding thereon connected in series circuit relation with the main brushes and a sufficient cross section to prevent saturation for the maximum value of welding current, magnetic shunt means associated with the pole member to provide a leakage path linking the winding, and an additional field pole member positioned in opposed relation to said field pole member having a field winding positioned thereon connected in series circuit relation with the main brushes and a cross sectional area sufficiently small to effect saturation at the minimum value of welding current.

7. A welding generator comprising, an armature having main brushes for connecting it to a welding circuit, a field pole member associated with the armature having a field winding thereon connected in series circuit relation with the main brushes and the welding circuit, said field pole member having a sufficiently large cross sectional area to prevent saturation at any value of welding current, magnetic shunt means positioned adjacent the field pole member to provide a relatively low reluctance leakage path substantially enclosing the winding, and an additional field pole member positioned in opposed relation to said first-mentioned field pole member having a field winding thereon connected in series circuit relation with the main brushes and the load circuit, said additional field pole member having a reduced section so as to effect saturation below the minimum value of welding curernt.

JOHN H. BLANKENBUEHLER.